United States Patent
Cho et al.

(10) Patent No.: US 7,959,318 B2
(45) Date of Patent: Jun. 14, 2011

(54) BACKLIGHT MODULE

(75) Inventors: Chin-Hsing Cho, Yunlin County (TW);
Tsao-Yuan Fu, Taoyuan Hsien (TW);
Sheng-Chieh Chao, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 356 days.

(21) Appl. No.: 12/242,943

(22) Filed: Oct. 1, 2008

(65) Prior Publication Data
US 2009/0323312 A1    Dec. 31, 2009

(30) Foreign Application Priority Data

Jun. 26, 2008 (TW) .............................. 97123986 A

(51) Int. Cl.
*F21V 19/00* (2006.01)
(52) U.S. Cl. .................. 362/217.15; 362/97.1; 362/219
(58) Field of Classification Search .............. 362/97.1, 362/97.2, 219, 217.14, 217.15, 217.16, 217.17
See application file for complete search history.

(56) References Cited

U.S. PATENT DOCUMENTS

| | | | | |
|---|---|---|---|---|
| 7,607,791 B2 * | 10/2009 | Yoo et al. | ..................... | 362/97.2 |
| 2006/0193134 A1 * | 8/2006 | Lin et al. | ..................... | 362/294 |
| 2007/0230169 A1 | 10/2007 | Kwon et al. | | |
| 2008/0143920 A1 * | 6/2008 | Back et al. | ..................... | 349/58 |
| 2008/0316739 A1 * | 12/2008 | Cho et al. | ..................... | 362/221 |

FOREIGN PATENT DOCUMENTS

| | | |
|---|---|---|
| TW | 200714993 | 4/2007 |
| TW | 200735488 | 9/2007 |

* cited by examiner

*Primary Examiner* — Laura Tso
(74) *Attorney, Agent, or Firm* — Jianq Chyun IP Office

(57) ABSTRACT

A backlight module including a first side frame, a plurality of first elastic holding elements, a second side frame, a plurality of second elastic holding elements, and a plurality of lamps is provided. The first side frame has a plurality of first containing grooves, and the first elastic holding elements are disposed in the first containing grooves respectively. In addition, the second side frame has a plurality of second containing grooves, and the second elastic holding elements are disposed in the second containing grooves respectively. The lamps are connected between the first side frame and the second side frame. Two ends of the lamps are fixed through the first elastic holding elements and the second elastic holding elements.

10 Claims, 8 Drawing Sheets

BACKLIGHT MODULE

CROSS-REFERENCE TO RELATED APPLICATION

This application claims the priority benefit of Taiwan application serial no. 97123986, filed on Jun. 26, 2008. The entirety of the above-mentioned patent application is hereby incorporated by reference herein and made a part of specification.

BACKGROUND OF THE INVENTION

1. Field of the Invention

The present invention relates to a backlight module, in particular, to a backlight module adapted to be assembled quickly.

2. Description of Related Art

In a common liquid crystal display (LCD), since a liquid crystal display panel cannot emit light actively, a backlight module is provided to be arranged under the liquid crystal display panel for providing a light source. Generally speaking, the backlight module mainly includes cold cathode fluorescent lamps (CCFL) and receptacles at two ends of each cold cathode fluorescent lamps.

Taiwan Patent Publication No. 200735488 has disclosed the receptacles which may be used to fix two ends of cold cathode fluorescent lamps. It should be noted that the two ends of each cold cathode fluorescent lamp must be fixed by two receptacles respectively. Therefore, the manufacturing cost of the conventional backlight module cannot be reduced. Furthermore, the receptacles are fixed at the two ends of each cold cathode fluorescent lamp during the assembly, which wastes working hours. On the other hand, the conventional receptacle includes a plurality of receptacle terminals capable of holding guide wires extended from the two ends of the cold cathode fluorescent lamps. In practice, the cold cathode fluorescent lamps cannot be effectively fixed by the receptacles. The positions of the cold cathode fluorescent lamps may possibly shift when the backlight module is under an external force, and guide wires may part from the cold cathode fluorescent lamps due to vibration, which reduces the life time of the cold cathode fluorescent lamps.

SUMMARY OF THE INVENTION

The present invention provides a backlight module, which may efficiently reduce the manufacturing cost and has higher reliability.

The present invention provides a backlight module, which includes a first side frame, a plurality of first elastic holding elements, a second side frame, a plurality of second elastic holding elements, and a plurality of lamps. The first side frame includes a plurality of first containing grooves, the first elastic holding elements are disposed in the first containing grooves. Moreover, the second side frame has a plurality of second containing grooves, and the second elastic holding elements are disposed in the second containing grooves respectively. The lamps are connected between the first side frame and the second side frame. Two ends of the lamps are positioned through the first elastic holding elements and the second elastic holding elements respectively.

In an embodiment of the present invention, the first side frame further includes a plurality of first lateral grooves and a plurality of first positioning bumps. The first lateral grooves are disposed in the first containing grooves, and the first positioning bumps are disposed on inner walls of the first containing grooves.

In an embodiment of the present invention, each of the first elastic holding elements includes a first holding portion, a first positioning portion, a first connecting portion, and a first bending portion. The first holding portion and the first bending portion are respectively formed at two ends of the first connecting portion, and the first positioning portion is disposed on the first connecting portion. When the first elastic holding elements are disposed in the first containing grooves respectively, the first positioning portions are adapted to be embedded into the first lateral grooves, and the first positioning bumps are adapted to be engaged with the first connecting portions, so as to position the first elastic holding elements.

In an embodiment of the present invention, each of the first elastic holding elements includes a first holding portion, a first connecting portion, and a first bending portion. The first holding portion and the first bending portion are formed at two ends of the first connecting portion respectively.

In an embodiment of the present invention, the backlight module further includes a plurality of first elastic elements. Each of the first elastic elements includes a first recess hole. The first elastic elements enwrap the first holding portions, respectively. Furthermore, the first recess holes expose the first holding portions respectively.

In an embodiment of the present invention, the second side frame further includes a plurality of second lateral grooves and a plurality of second positioning bumps. The second lateral grooves are disposed in the second containing grooves, and the second positioning bumps are disposed on inner walls of the second containing grooves.

In an embodiment of the present invention, each of the second elastic holding elements includes a second holding portion, a second connecting portion, and a second positioning portion. The second holding portion and the second positioning portion are formed at two ends of the second connecting portion respectively. When the second elastic holding elements are disposed in the second containing grooves respectively, the second positioning portions are adapted to be embedded into the second lateral grooves, so as to position the second elastic holding elements, and the second positioning bumps are adapted to be engaged with the second connecting portion.

In an embodiment of the present invention, each of the second elastic holding elements includes a second holding portion and a second connecting portion. The second holding portion is formed at one end of the second connecting portion.

In an embodiment of the present invention, the backlight module further includes a plurality of second elastic elements. Each of the second elastic elements includes a second recess hole, and the second elastic elements enwrap the second holding portions respectively. Furthermore, the second recess holes expose the second holding portions respectively.

In an embodiment of the present invention, the backlight module further includes a conductive rod. The adjacent two second elastic holding elements are connected to each other via the conductive rod.

In an embodiment of the present invention, the backlight module further includes a conductive rod, and the second elastic holding elements are connected together via the conductive rod.

In the present invention, the lamps may be fixed in the backlight module through the first elastic holding elements in the first side frame and the second elastic holding elements in the second side frame, thereby effectively saving the assembly working hours and reducing the manufacturing cost.

BRIEF DESCRIPTION OF THE DRAWINGS

The accompanying drawings are included to provide a further understanding of the invention, and are incorporated in and constitute a portion of this specification. The drawings illustrate embodiments of the invention and, together with the description, serve to explain the principles of the invention.

DESCRIPTION OF THE EMBODIMENTS

Figure 1A:
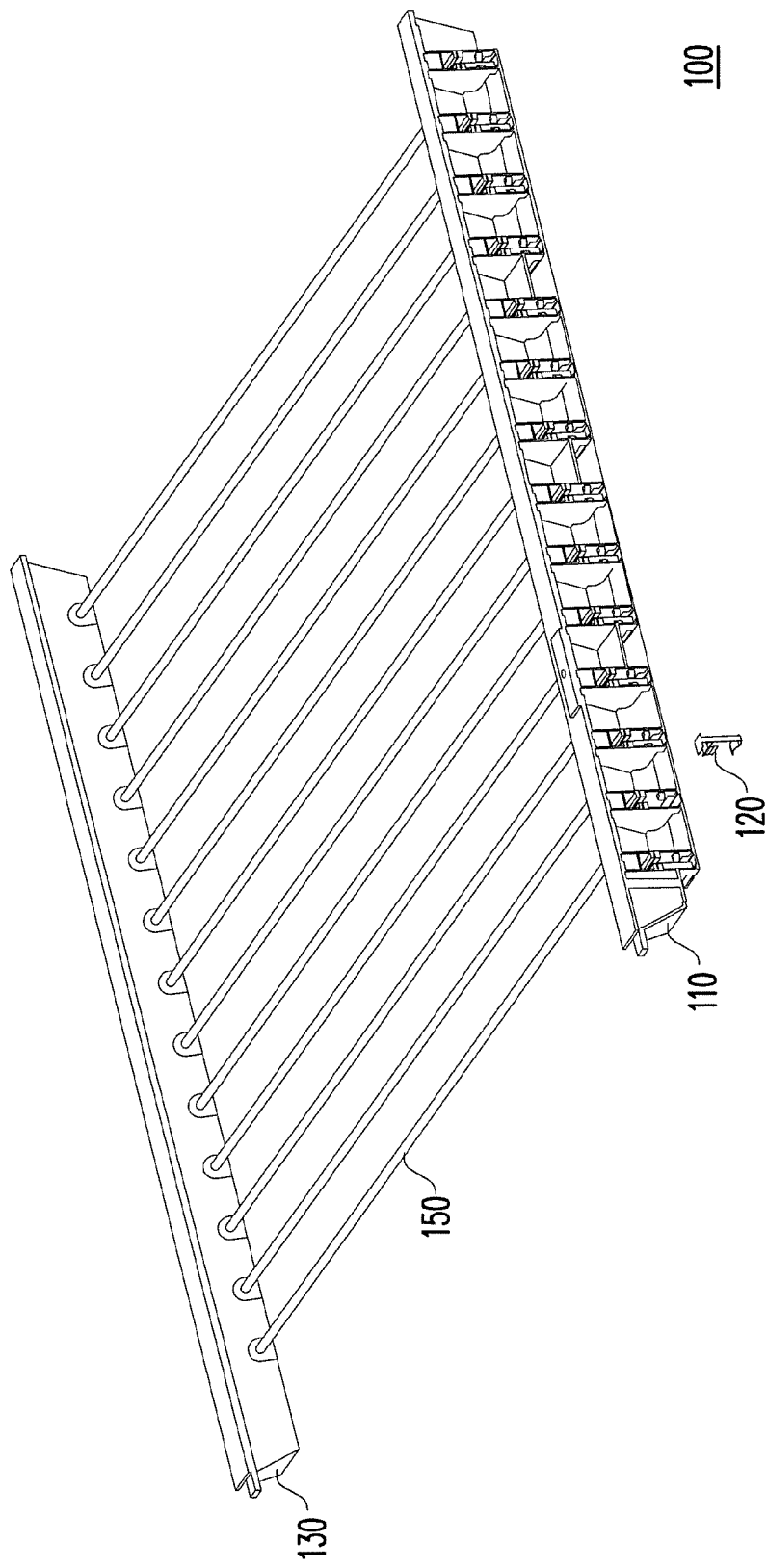
FIG. 1A is a schematic view of a backlight module according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like portions.

Figure 1B:
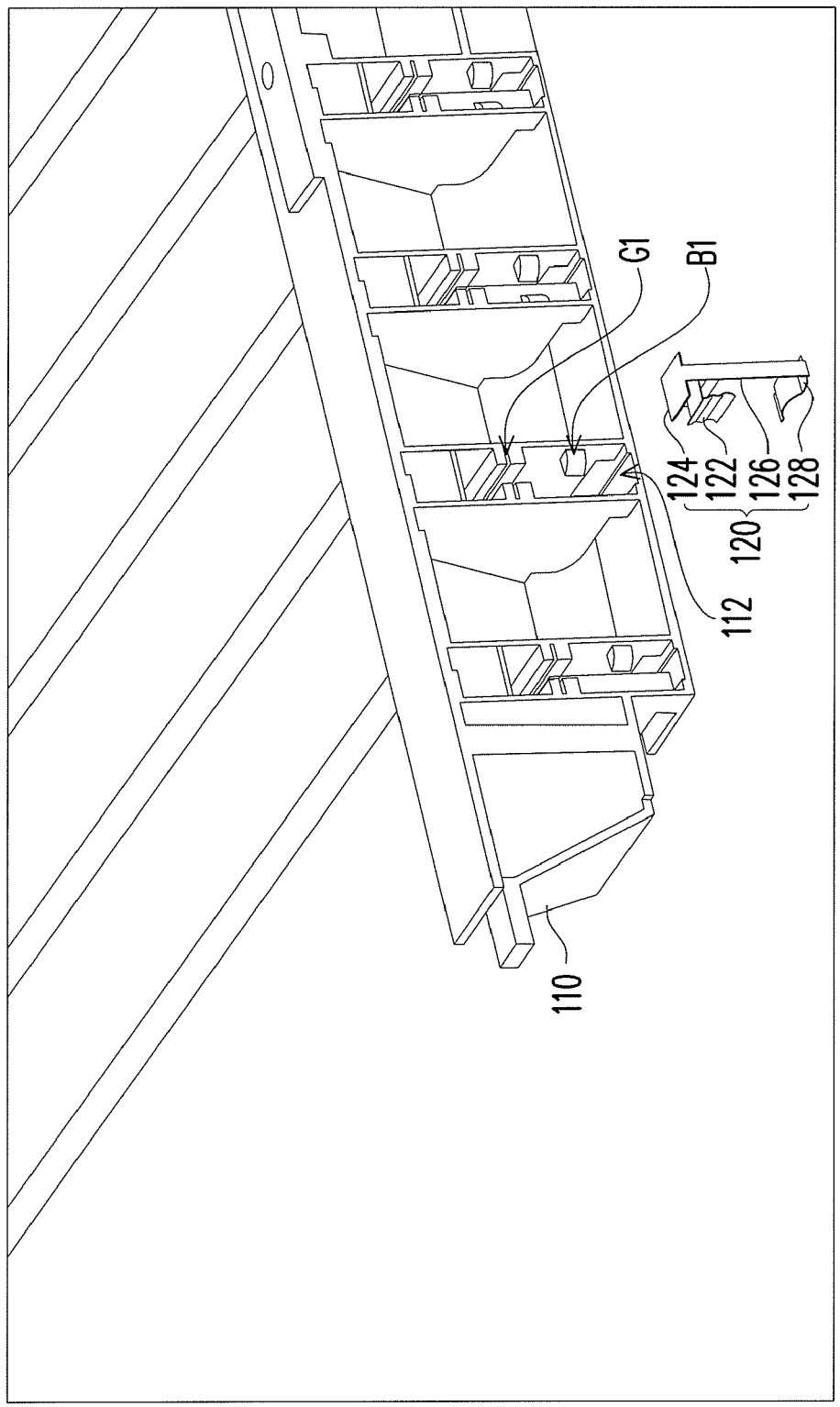
FIG. 1B is a local enlarged view of the first side frame according to the present invention.
Figure 1C:
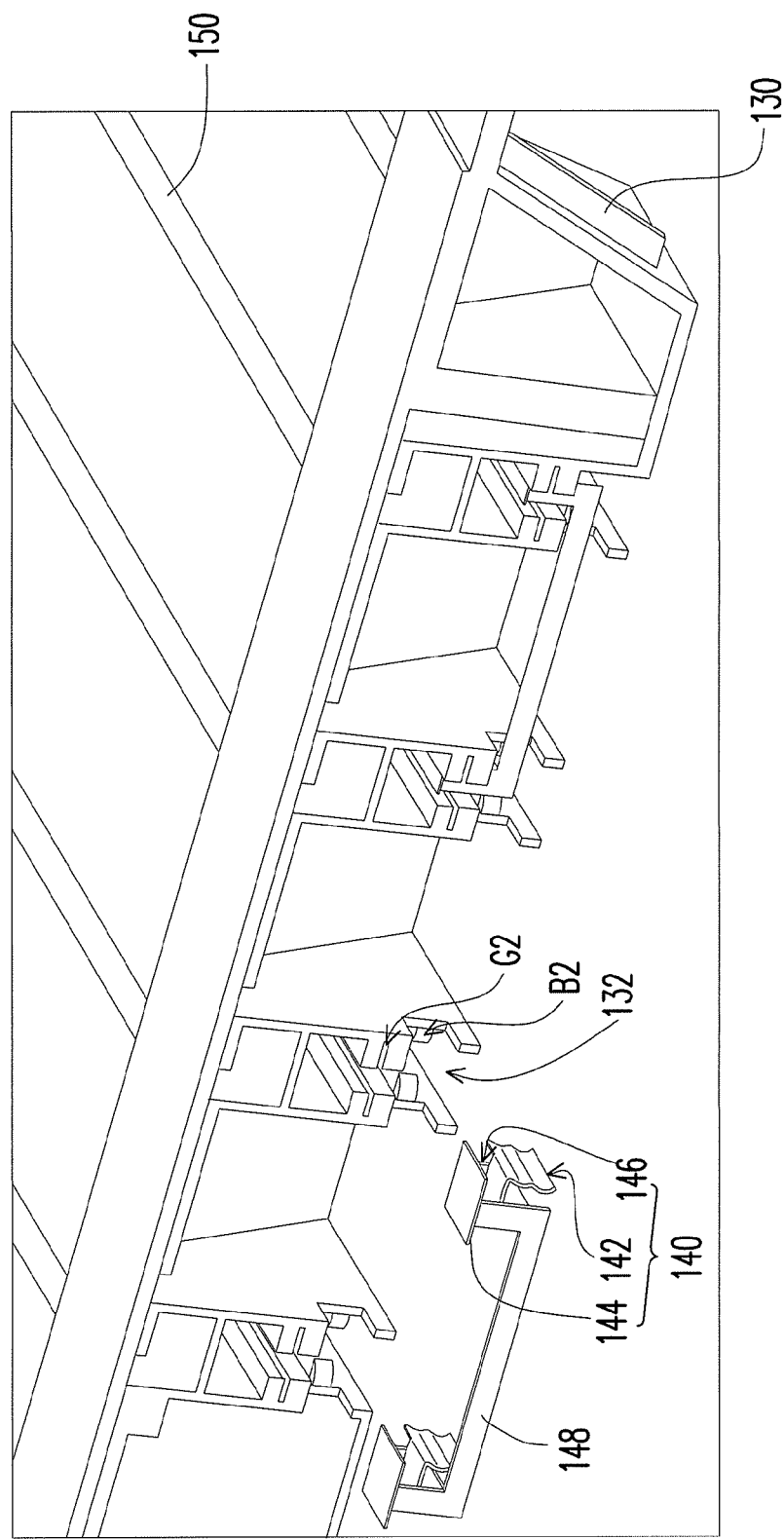
FIG. 1C is a local enlarged view of the second side frame according to the present invention.

FIG. 1A is a schematic view of a backlight module according to an embodiment of the present invention, FIG. 1B is a local enlarged view of the first side frame according to the present invention, and FIG. 1C is a local enlarged view of the second side frame according to the present invention. Referring to FIGS. 1A, 1B, and 1C, the backlight module 100 in the present invention includes a first side frame 110, a plurality of first elastic holding elements 120, a second side frame 130, a plurality of second elastic holding elements 140, and a plurality of lamps 150. The lamps 150 are connected between the first side frame 110 and the second side frame 130. Furthermore, the first side frame 110 in FIG. 1B includes a plurality of first containing grooves 112, and the first elastic holding elements 120 are disposed in the first containing grooves 112. The second side frame 130 in FIG. 1C includes a plurality of second containing grooves 132, and the second elastic holding elements 140 are disposed in the second containing grooves 132. In practice, the lamps 150 are, for example, cold cathode fluorescent lamps, and two ends of each of the lamps 150 are positioned respectively through the corresponding first elastic holding elements 120 and second elastic holding elements 140.

In detail, the first side frame 110 in FIG. 1B further includes a plurality of first lateral grooves G1 and a plurality of first positioning bumps B1. The first lateral grooves G1 are disposed in the first containing grooves 112 and the first positioning bumps B1 are disposed on inner walls of the first containing grooves 112. Furthermore, each of the first elastic holding elements 120 in the present invention includes a first holding portion 122, a first positioning portion 124, a first connecting portion 126, and a first bending portion 128. The first holding portion 122 and the first bending portion 128 are formed at two ends of the first connecting portion 126 respectively, and the first positioning portion 124 is disposed on the first connecting portion 126. In detail, when the first elastic holding elements 120 are embedded into the first containing grooves 112, the first positioning portions 124 will be embedded into the first lateral grooves G1, and the first positioning bumps B1 will be engaged with the first connecting portions 126, so as to position the first elastic holding elements 120. In practice, when the lamps 150 are assembled into the first containing grooves 112, the first holding portions 122 may be elastically deformed to hold one end of each of the lamps 150 correspondingly.

In another aspect, the second side frame 130 in FIG. 1C further includes a plurality of second lateral grooves G2 and a plurality of second positioning bumps B2. The second lateral grooves G2 are disposed in the second containing grooves 132 and the second positioning bumps B2 are disposed on inner walls of the second containing grooves 132. Furthermore, each of the second elastic holding elements 140 includes a second holding portion 142, a second positioning portion 144, and a second connecting portion 146. The second holding portion 142 and the second positioning portion 144 are respectively connected to two ends of the second connecting portion 146. In an embodiment, two adjacent second elastic holding elements 140 may be further connected through a conductive rod 148. In detail, when the second elastic holding elements 140 are disposed in the second containing grooves 132, the second positioning portions 144 will be embedded into the second lateral grooves G2, and the second positioning bumps B2 will be engaged with the second connecting portion 146, so as to position the second elastic holding elements 140.

Figure 1D:
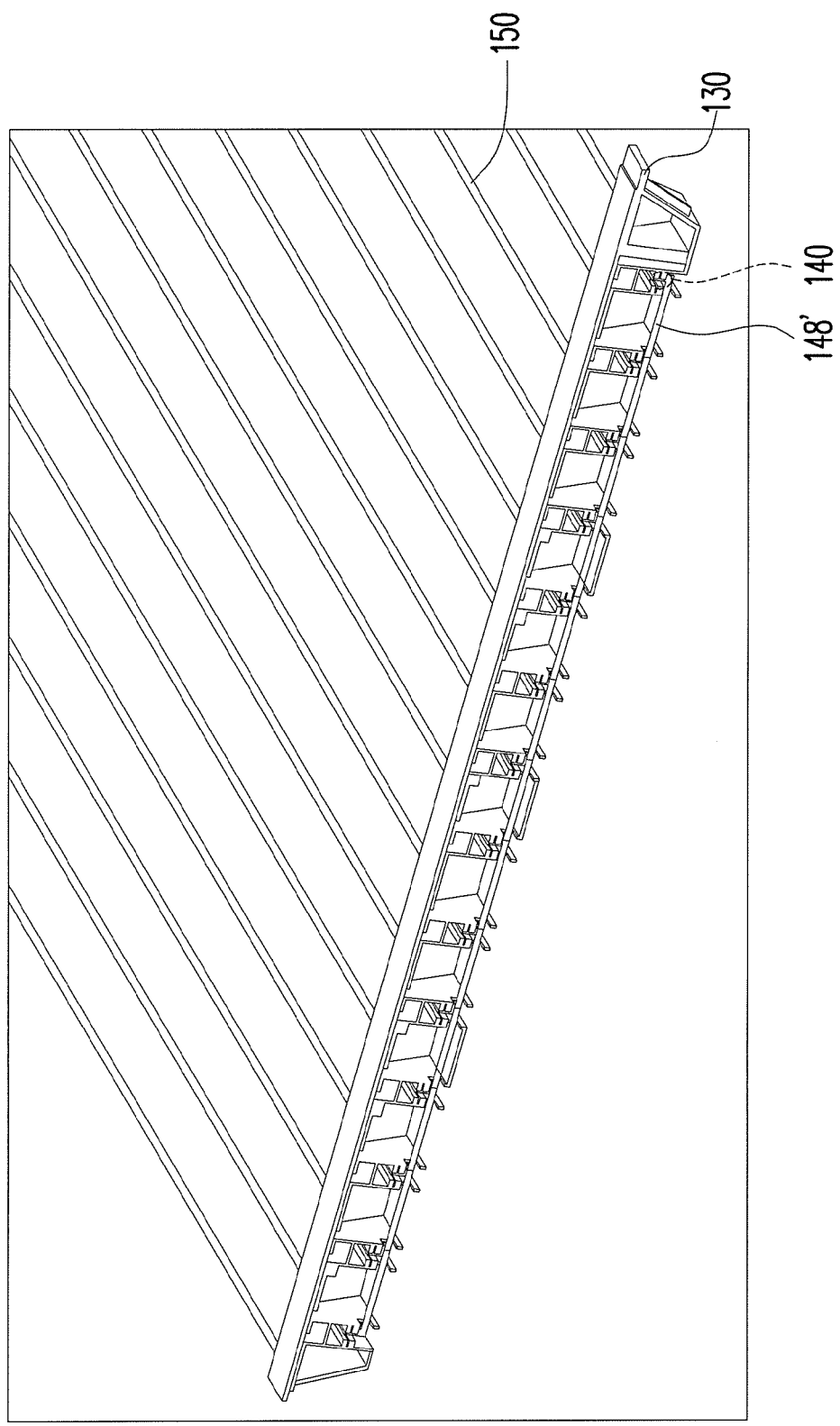
FIG. 1D is a schematic view of the conductive rod connected with all the second elastic holding elements according to the present invention.

It should be noted that the second holding portions 142 may be elastically deformed to hold another end of each of the lamps 150 correspondingly. In particular, the first holding portion 122 and the second holding portion 142 may hold two ends of the lamps 150 to effectively fix the lamps 150 respectively without a welding process, thereby saving the assembling time effectively. Furthermore, different from the conventional technology, the lamps 150 in the present invention do not need receptacles. Therefore, the backlight module 100 in the present invention may further save the manufacturing cost. In another embodiment, the conductive rod 148' in FIG. 1D may further be connected with all the second elastic holding elements 140 together, such that the second elastic holding elements 140 form a conductive circuit.

Figure 2A:
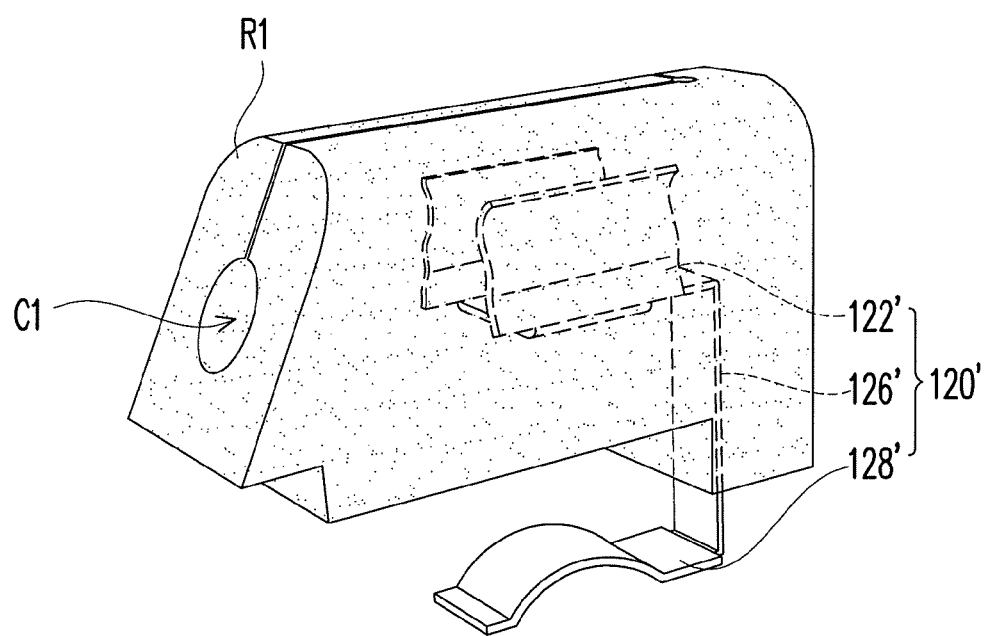
FIG. 2A is an enlarged view of another first elastic holding element according to the present invention.
Figure 2B:
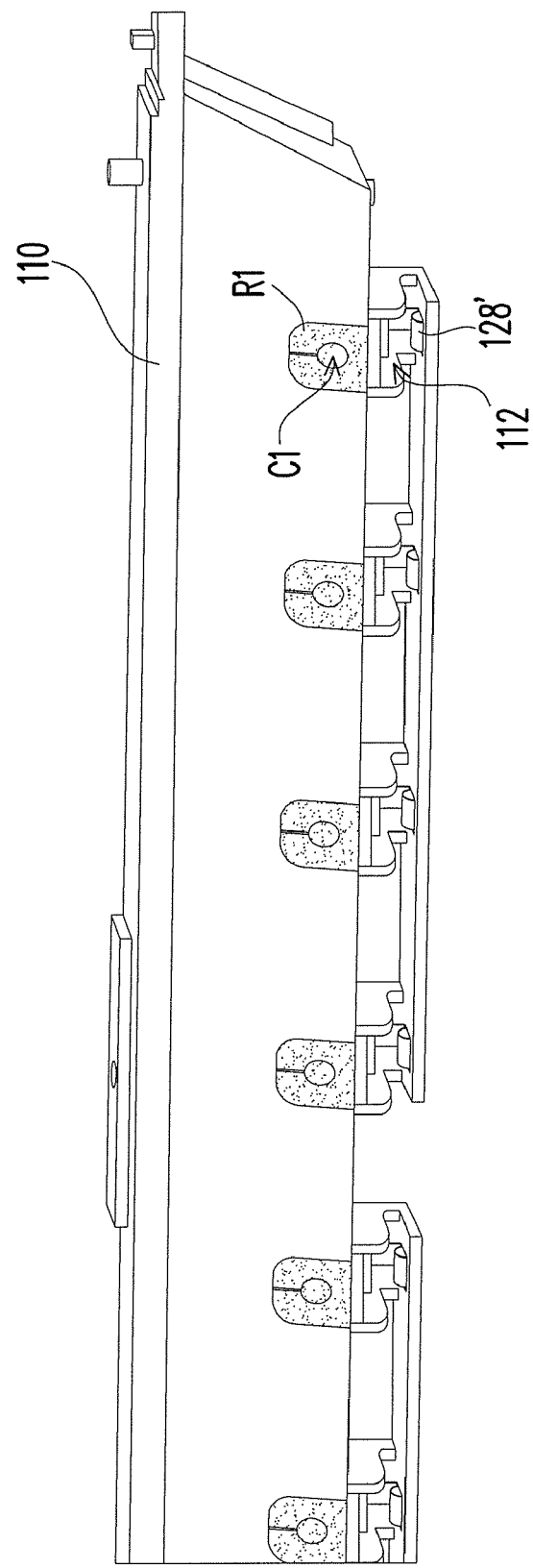
FIG. 2B is a schematic view of another first elastic holding element assembled to the first side frame according to the present invention.

Definitely, the shapes of the first elastic holding elements 120 and the second elastic holding elements 140 may be adjusted by those of ordinary skill in the art upon requirements. FIG. 2A is an enlarged view of another first elastic holding element according to the present invention. Referring to FIG. 2A, the first elastic holding elements 120' includes a first holding portion 122', a first connecting portion 126', and a first bending portion 128'. The first holding portion 122' and the first bending portion 128' are located at two ends of the first connecting portion 126' respectively. Furthermore, the first holding portions 122' may be further enwrapped by first elastic elements R1 respectively. Each of the first elastic elements R1 includes a first recess hole C1, so that the first holding portion 122' is exposed by the first recess hole C1. FIG. 2B is a schematic view of another first elastic holding element assembled to the first side frame according to the present invention. Referring to FIGS. 2A and 2B, the first elastic holding elements 120' and the first elastic elements R1 may be assembled into the first side frame 110. It is worth mentioning that the first bending portions 128' of the first elastic holding elements 120' may be used to fix a circuit board (not shown).

Figure 3A:
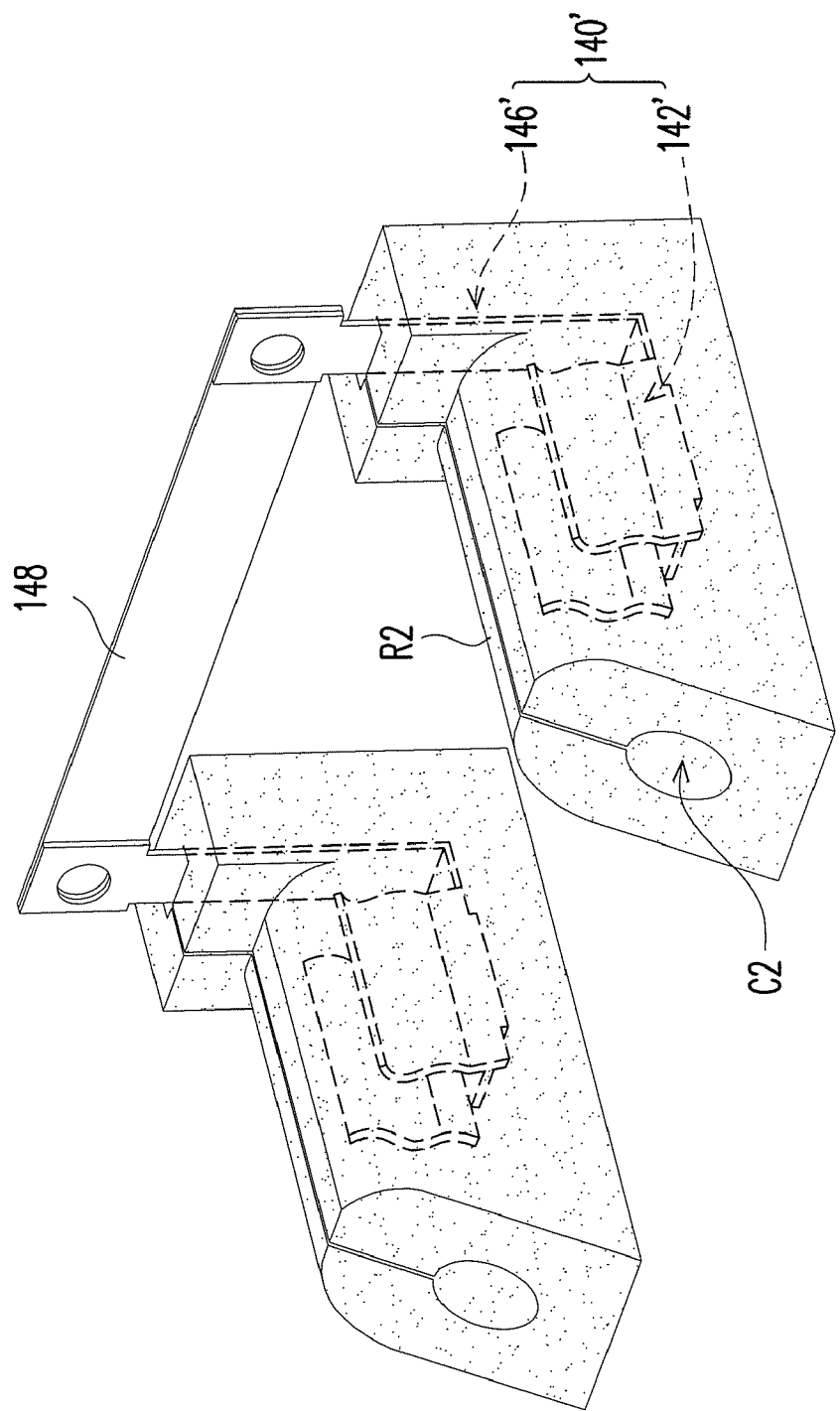
FIG. 3A is an enlarged view of another second elastic holding element according to the present invention.
Figure 3B:
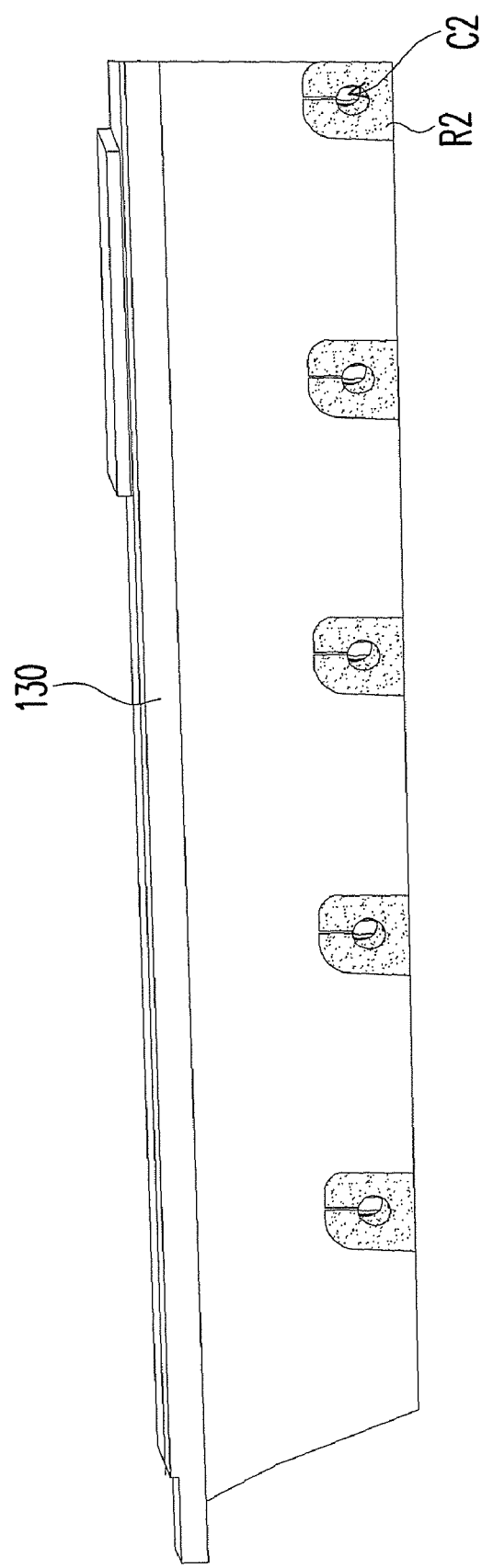
FIG. 3B is a schematic view of another second elastic holding elements assembled to the second side frame according to the present invention.

FIG. 3A is an enlarged view of another second elastic holding element according to the present invention. Referring to FIG. 3A, each of the second elastic holding elements 140' includes a second holding portion 142' and a second connecting portion 146'. The second holding portion 142' is located at one end of the second connecting portion 146'. Furthermore, the second holding portions 142' may be enwrapped by the second elastic elements R2. Each of the second elastic elements R2 includes a second recess hole C2, so that the second holding portion 142' is exposed by the second recess hole C2. FIG. 3B is a schematic view of another second elastic holding elements assembled to the second side frame according to the present invention. Referring to FIGS. 3A and 3B, the second elastic holding elements 140' and the second elastic elements R2 may be assembled into the second side frame 130.

To sum up, in the present invention, the lamps may be fixed in the backlight module through the first elastic holding elements in the first side frame and the second elastic holding elements in the second side frame, thereby efficiently saving the assembling hours and reducing the manufacturing cost.

It will be apparent to those skilled in the art that various modifications and variations can be made to the structure of the present invention without depart from the scope or spirit of the invention. In view of the foregoing, it is intended that the present invention cover modifications and variations of this invention provided they fall within the scope of the following claims and their equivalents.

What is claimed is:

1. A backlight module, comprising:
   a first side frame, comprising a plurality of first containing grooves, a plurality of first lateral grooves and a plurality of first positioning bumps, the first lateral grooves are disposed in the first containing grooves respectively, and the first positioning bumps are disposed on inner walls of the first containing grooves;
   a plurality of first elastic holding elements, disposed in the first containing grooves respectively;
   a second side frame, comprising a plurality of second containing grooves;
   a plurality of second elastic holding elements, disposed in the second containing grooves respectively; and
   a plurality of lamps, connected between the first side frame and the second side frame, wherein two ends of each of the lamps are fixed through the first elastic holding elements and the second elastic holding elements respectively.

2. The backlight module according to claim 1, wherein each of the first elastic holding elements comprises a first holding portion, a first positioning portion, a first connecting portion, and a first bending portion, the first holding portion and the first bending portion are respectively formed at two ends of the first connecting portion, the first positioning portion is disposed on the first connecting portion, when the first elastic holding elements are respectively disposed in the first containing grooves, the first positioning portions are adapted to be embedded into the first lateral grooves, and the first positioning bumps are adapted to be engaged with the first connecting portions, so as to position the first elastic holding elements.

3. The backlight module according to claim 1, wherein each of the first elastic holding elements comprises a first holding portion, a first connecting portion, and a first bending portion, and the first holding portion and the first bending portion are formed at two ends of the first connecting portion respectively.

4. The backlight module according to claim 3, further comprising a plurality of first elastic elements, wherein each of the first elastic elements comprises a first recess hole, the first elastic elements respectively enwrap the first holding portions, and the first recess holes expose the first holding portions respectively.

5. The backlight module according to claim 1, wherein the second side frame further comprises a plurality of second lateral grooves and a plurality of second positioning bumps, the second lateral grooves are disposed in the second containing grooves respectively, and the second positioning bumps are disposed on inner walls of the second containing grooves.

6. The backlight module according to claim 5, wherein each of the second elastic holding elements comprises a second holding portion, a second connecting portion, and a second positioning portion, the second holding portion and the second positioning portion are located at two ends of the second connecting portion respectively, when the second elastic holding elements are disposed in the second containing grooves respectively, the second positioning portions are adapted to be embedded into the second lateral grooves, so as to position the second elastic holding elements, and the second positioning bumps are adapted to be engaged with the second connecting portion.

7. The backlight module according to claim 5, wherein each of the second elastic holding elements comprises a second holding portion and a second connecting portion, and the second holding portion is located at one end of the second connecting portion.

8. The backlight module according to claim 7, further comprising a plurality of second elastic elements, wherein each of the second elastic elements comprises a second recess hole, the second elastic elements enwrap the second holding portions respectively, and the second recess holes expose the second holding portions respectively.

9. The backlight module according to claim 1, further comprising a conductive rod, wherein two adjacent second elastic holding elements are connected to each other via the conductive rod.

10. The backlight module according to claim 1, further comprising a conductive rod, wherein the second elastic holding elements are connected together via the conductive rod.

* * * * *